April 25, 1944.   L. H. MORIN   2,347,428
MORTISE JOINT SEPARABLE FASTENER
Filed May 23, 1942
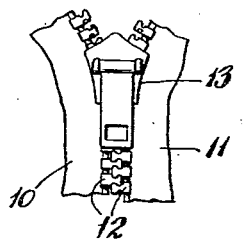
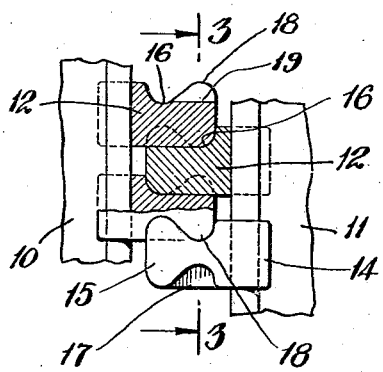
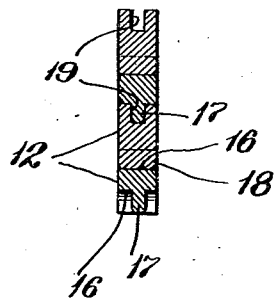
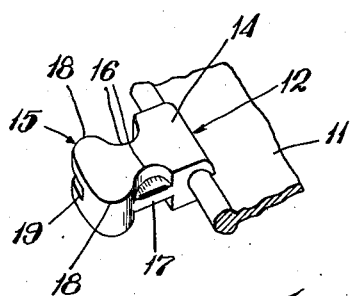
INVENTOR
LOUIS H. MORIN
BY
ATTORNEYS Patented Apr. 25, 1944

2,347,428

UNITED STATES PATENT OFFICE 2,347,428

MORTISE JOINT SEPARABLE FASTENER

Louis H. Morin, Bronx, N. Y., assignor of one-half to Davis Marinsky, Bronx, N. Y.

Application May 23, 1942, Serial No. 444,192

11 Claims. (Cl. 24—205)

This invention relates to separable fasteners employing stringers having links or scoops adapted to be coupled and uncoupled by a slider movable along the stringers. More particularly the invention relates to a link or scoop construction having, in addition to the normal male and female coupling portion, sockets and fins producing in the coupled stringers what may be termed a tongue and groove or mortise joint between adjacent coupled links or scoops. Further, a scoop structure of this kind wherein each scoop includes a tongue or fin as well as a channel or socket to receive the tongue or fin on the scoop of an opposed stringer. The novel features of the invention will be best understood from the following description when taken together with the accompanying drawing, in which certain embodiments of the invention are disclosed, and in which the separate parts are designated by suitable reference characters in each of the views; and in which:

Fig. 1 is a face view of a part of a fastener made according to my invention with a slider thereon;

Fig. 2 is an enlarged side and sectional view showing a portion of two stringers with the links in coupled engagement to each other;

Fig. 3 is a section on the line 3—3 of Fig. 2; and

Fig. 4 is a perspective view showing a single link or scoop on the edge of a mounting tape.

In the normal construction of separable fasteners of the kind under consideration there is a reasonable amount of play or movement between adjacent coupled links which gives to the fastener sufficient flexibility to care for average installations and uses thereof. There are instances, however, where it is desirable to materially minimize this flexure of the coupled stringers in order to maintain a relatively straight and aligned closure and wherein the coupled links would form a more or less rigid rod-like structure. However, it will be understood that the degree of rigidity may be governed by the snugness in the fit between the tongue and the receiving groove, and in some instances these couplings may be modified to provide a predetermined desired flexure in producing in the resulting coupled stringers predetermined curvatures.

Another feature of the present link construction resides in the fact that a single stringer link can be produced. In other words, the construction of left and right stringers is not necessary.

In Figs. 1 and 2 of the drawing I have illustrated portions of two stringers 10 and 11 to the adjacent beaded edges of which are attached links or scoops 12. In Fig. 1, 13 represents a slider movable along the stringers to couple the links or scoops of proposed stringers.

All of the links or scoops are of the same structure; thus it will be essential only to describe the structure of one. In Fig. 4 of the drawing I have shown in perspective a single link or scoop arranged upon one of the stringer tapes, for example, the tape 11. The link comprises a body having a mounting end portion 14 arranged upon the beaded edge of the tape and a coupling end portion 15. The coupling end portion has adjacent the mounting end 14 on opposite surfaces thereof curved recesses 16, and arranged centrally of one of these recesses is a transverse web, fin or tongue 17. Outwardly of the recesses 16 the said surfaces have rounded projections 18 of such contour as to fit freely but snugly in the recesses 16, and one of the projections 18 has centrally thereof a groove, channel or recess 19 which is in alignment with the base of the adjacent recess 16 as clearly seen in the upper part of Fig. 2 of the drawing. It will appear that the groove 19 is disposed on the member 18 on the surface of the link which is opposite to the surface which includes the tongue 17. It will thus be seen, from a consideration of Fig. 2 of the drawing, that the tongue 17 of one link enters the groove 19 of an adjacent coupled link, or in other words, on the link attached to the companion stringer.

When a snug fit is desired between the tongue 17 and groove 19 to provide rigidity through the coupled links the outer edges of the tongues 17 will be slightly rounded in order to facilitate free entrance of the tongues in the grooves 19. In some instances, however, extreme clearances will be provided or even the beveling of the walls of the tongue and groove structure in order to provide limited and controlled swinging movement of the links one upon the other. It will be understood that in so far as each stringer itself is concerned, normal flexibility is provided in the spacing of the links or scoops longitudinally of the tapes. This will facilitate the coupling and uncoupling of the stringer, but after the stringers have been coupled the degree of rigidity and bending flexure may be positively controlled. In the present construction the tongue and groove are comparatively narrow with respect to the full thickness of the link or scoop, but here again this may be varied in different uses of the fastener.

The general structure of the link herein disclosed is simply illustrative of one adaptation of the invention and it will be apparent that insofar as the coupling engagement between the links is concerned, which engagement retains the stringers against lateral separation, this coupling may be modified, the only essential feature being to provide an engagement which will facilitate coupling and uncoupling of the links by a suitable slider movable along the stringers.

It will be understood that the tongue and groove coupling of the adjacent links or scoops, in addition to providing the rigidity set forth, also constitute coupling elements which retain the coupled scoops against transverse separation. From this standpoint the tongues 17 may well be termed keys entering key channels 19.

Having fully described my invention, what I claim as new and desire to secure by Letters Patent is:

1. In separable fastener stringers, a link body comprising a mounting end portion and a coupling end portion, said coupling end portion having identical members projecting from each of the opposed surfaces at the outer end thereof, and identical recesses inwardly of said projecting members and substantially conforming to the contour thereof, to receive the projecting members of a link of an opposed stringer, a fin arranged centrally of a recess on one surface of said link, and the projecting member on the other surface of said link having a socket for receiving the fin of an adjacent link.

2. A scoop for separable fastener stringers, said scoop comprising a body having a mounting end portion and a coupling end portion, one side surface of the coupling end portion having a channel opening through opposed sides of said body, the other side surface having two channels opening through side surfaces and divided by an intermediate web, the first named side surface having outwardly of the channel a projecting coupling member, and said coupling member having a groove centrally thereof opening into said channel and outwardly through the coupling end of said body.

3. A separable fastener employing stringers coupled and uncoupled by a slider movable along the stringers, each stringer having links spaced longitudinally of one edge thereof, each of said links having the same structure and comprising a body portion having a mounting end and a coupling end, the coupling end having, adjacent the mounting end, a constricted neck portion defined by opposed curved surfaces arranged in convex relation to each other and defining recess portions; the coupling end also having, adjacent said constricted neck portion, an enlarged head portion defined by opposed curved surfaces arranged in concave relation to each other, the head portion and neck portion of each link being complementary to and adapted to engage the neck portion and head portion of an adjacent link, respectively, and to prevent lateral separation of said links when coupled, each link also having means to prevent transverse separation of the coupled links, said means comprising a tongue arranged centrally and longitudinally of a recess on one surface of said link and a groove in the head portion and on the other surface of said link adapted to receive the tongue on an adjacent link.

4. A separable fastener employing stringers coupled and uncoupled by a slider movable along the stringers, each stringer having links spaced longitudinally of one edge thereof, each of said links having the same structure and comprising a body portion having a mounting end and a coupling end, the coupling end having, adjacent the mounting end, a constricted neck portion defined by opposed curved surfaces arranged in convex relation to each other and defining recess portions; the coupling end also having, adjacent said constricted neck portion, an enlarged head portion defined by opposed curved surfaces arranged in concave relation to each other, the head portion and neck portion of each link being complementary to and adapted to engage the neck portion and head portion of an adjacent link, respectively, and to prevent lateral separation of said links when coupled, said neck and head portions having tongue and groove means, respectively, complementary to those on an adjacent link and adapted to prevent transverse separation of said links when coupled.

5. A separable fastener employing stringers coupled and uncoupled by a slider movable along the stringers, each stringer having links spaced longitudinally of one edge thereof, each of said links having the same structure and comprising a body portion having a mounting end and a coupling end, the coupling end having, adjacent the mounting end, a constricted neck portion, defining a pair of oppositely disposed recesses, and an enlarged head portion adjacent to and disposed outwardly of said neck portion and providing a pair of oppositely disposed projections, the projections and recesses of each link being complementary to and adapted to engage the recesses and projections of an adjacent link, respectively, and to prevent lateral separation of said links when coupled, said neck and head portions having tongue and groove means, respectively, complementary to those on an adjacent link and adapted to prevent transverse separation of said links when coupled.

6. A separable fastener comprising stringers, having links spaced longitudinally of one edge thereof adapted to be coupled and uncoupled by a slider movable along the stringers, the links of each stringer having similar male and female coupling portions on each of the opposed surfaces thereof retaining coupled stringers against lateral separation, the male portion of one surface having a slot, and the female portion of the other surface having a rib to engage the slotted male portion of the link of a companion stringer in retaining the links against transverse separation.

7. In separable fastener stringers, a link body comprising a mounting end portion and a coupling end portion, said coupling end portion having members projecting from opposed surfaces at the outer end thereof, said surfaces having recesses inwardly of said members and substantially conforming to the contour of said members to receive the members of links of an opposed stringer, a fin arranged centrally of a recess on one surface of said link, the projecting member on the other surface of said link having a socket for receiving the fin of an adjacent link, and said fin and socket being both elongated in a direction longitudinally of the coupling end portion of the link.

8. A separable fastener comprising stringers, having links spaced longitudinally of one edge thereof adapted to be coupled and uncoupled by a slider movable along the stringers, the projecting coupling ends of the links of each stringer having male and female coupling portions on each of the opposed surfaces thereof, the male coupling portions of the links of one stringer engaging the female coupling portions of the links of the opposed stringer in retaining coupled stringers against lateral separation, means extending throughout the major portion of the length of the coupling ends of said links for keying coupled links against transverse separation, said last named means comprising an elongated slot in the male portion of one surface of each link, and an elongated rib on the female portion of the other surface of the links adapted to engage the slot of the male portion of an opposed stringer.

9. In separable fasteners employing stringers, having links spaced longitudinally of one edge thereof, each link comprising a body having a mounting end portion and a coupling end portion, said coupling end portion having projecting members extending transversely thereof at outer ends and opposite surfaces of the link body, said surfaces having transversely extending recesses inwardly of said members and adapted to receive the members of links on a companion stringer, and means on opposed surfaces of each link body and collectively extending throughout the major portion of the longitudinal length of the coupling end portion of said body for retaining coupled links against transverse separation.

10. In separable fasteners employing stringers, having links spaced longitudinally of one edge thereof, each link comprising a body having a mounting end portion and a coupling end portion, said coupling end portion having projecting members extending transversely thereof at outer ends and opposite surfaces of the link body, said surfaces having transversely extending recesses inwardly of said members and adapted to receive the members of links on a companion stringer, and means on opposed surfaces of each link body and collectively extending throughout the major portion of the longitudinal length of the coupling end portion of said body for retaining coupled links against transverse separation, said means including a thin rib bridging one of said recesses and adapted to be engaged by one of the transversely extending projecting members of the adjacent link of the opposite stringer.

11. A separable fastener employing stringers coupled and uncoupled by a slider movable along the stringers, each stringer having links spaced longitudinally of one edge thereof, each of said links having the same structure and comprising a body portion having a mounting end and a coupling end, the coupling end having, adjacent the mounting end, a constricted neck portion defined by opposed curved surfaces arranged in convex relation to each other and defining recess portions; the coupling end also having, adjacent said constricted neck portion, an enlarged head portion defined by opposed curved surfaces arranged in concave relation to each other, the head portion and neck portion of each link being complementary to and adapted to engage the neck portion and head portion of an adjacent link, respectively; and, to prevent lateral separation of said links when coupled, a thin rib extending across one of the two said recess portions of each link and uniting the body of the link on one side of the recess with the head portion of the link on the other side of the recess, the head portion having a recess and said rib engaging the recess of the head portion of the adjacent link of the opposite stringer.

LOUIS H. MORIN.